(12) United States Patent
Cavanaugh et al.

(10) Patent No.: US 10,252,374 B2
(45) Date of Patent: Apr. 9, 2019

(54) SYSTEM AND METHOD FOR LASER CLADDING IN CONTROLLED ENVIRONMENT

(71) Applicant: Caterpillar Inc., Peoria, IL (US)

(72) Inventors: Daniel T. Cavanaugh, Chillicothe, IL (US); Daniel Sordelet, Peoria, IL (US)

(73) Assignee: Caterpillar Inc., Deerfield, IL (US)

(*) Notice: Subject to any disclaimer, the term of this patent is extended or adjusted under 35 U.S.C. 154(b) by 520 days.

(21) Appl. No.: 15/005,682

(22) Filed: Jan. 25, 2016

(65) Prior Publication Data

US 2017/0209961 A1    Jul. 27, 2017

(51) Int. Cl.
| | |
|---|---|
| *B23K 26/12* | (2014.01) |
| *B23K 26/08* | (2014.01) |
| *B23K 26/34* | (2014.01) |
| *B23K 26/082* | (2014.01) |

(52) U.S. Cl.
CPC .......... *B23K 26/127* (2013.01); *B23K 26/082* (2015.10); *B23K 26/0823* (2013.01); *B23K 26/123* (2013.01); *B23K 26/34* (2013.01)

(58) Field of Classification Search
CPC .... B23K 26/342; B23K 26/34; B23K 26/127; B23K 26/1224; B23K 26/082
USPC ........................ 219/121.63, 121.64, 121.86
See application file for complete search history.

(56) References Cited

U.S. PATENT DOCUMENTS

| | | | |
|---|---|---|---|
| 6,429,402 B1* | 8/2002 | Dixon .................... | B23K 26/34 |
| | | | 219/121.63 |
| 6,583,379 B1 | 6/2003 | Meiners et al. | |
| 9,228,609 B2 | 1/2016 | Steinmetz et al. | |
| 2011/0135840 A1 | 6/2011 | Doye et al. | |
| 2013/0341313 A1* | 12/2013 | Himmelsbach ...... | B23K 26/127 |
| | | | 219/121.86 |
| 2014/0209576 A1* | 7/2014 | Ozbaysal ............. | B23K 26/345 |
| | | | 219/121.64 |
| 2014/0370323 A1 | 12/2014 | Ackelid | |
| 2015/0047201 A1 | 2/2015 | Steinmetz et al. | |
| 2015/0069025 A1 | 3/2015 | Luick et al. | |

(Continued)

FOREIGN PATENT DOCUMENTS

| | | |
|---|---|---|
| JP | 54-160535 A | 12/1979 |
| WO | WO 2014-183222 A1 | 11/2014 |

*Primary Examiner* — Tu B Hoang
*Assistant Examiner* — Vy T Nguyen
(74) *Attorney, Agent, or Firm* — Leydig, Voit & Mayer, Ltd.

(57) ABSTRACT

A laser cladding system includes a laser apparatus, a chamber, and a pump system. The laser apparatus is configured to generate a laser beam. The chamber includes an interior surface that defines a cladding area comprising a sealed volume. The chamber includes a window that is made from a laser-transparent material and is configured to allow the laser beam to pass therethrough into the cladding area. The pump system has a port in communication with the cladding area. The pump system is configured to selectively generate a vacuum pressure within the cladding area sufficient to evacuate gas from within the cladding area out through the port. The laser apparatus includes a laser head from which the laser beam is emitted and a robotic laser motion system configured to selectively move the laser head such that the laser beam moves relative to a reference point within the chamber.

18 Claims, 5 Drawing Sheets

(56) References Cited

U.S. PATENT DOCUMENTS

2015/0122783 A1    5/2015   Luick et al.
2015/0217414 A1    8/2015   Luick et al.

\* cited by examiner

SYSTEM AND METHOD FOR LASER CLADDING IN CONTROLLED ENVIRONMENT

TECHNICAL FIELD

This patent disclosure relates generally to systems and methods for laser cladding and, more particularly, to systems and methods for laser cladding in a controlled environment.

BACKGROUND

Laser cladding is a material deposition process in which a suitable material (e.g., a metal either in powder or wire form) is deposited onto a substrate by using a laser as a heat source to create a metallurgical bond between the deposited material and the substrate. Laser cladding can be used as an alternative to conventional welding and thermal spray techniques.

In some instances, laser cladding can be prone to defects, such as, excessive oxidation and porosity. The degree to which such instances occur can be dependent upon the type of material being deposited. Certain applications require extremely high quality (e.g., only limited porosity in the cladding layer being acceptable). Conventionally, a localized stream of inert shield gas is directed near the deposition site in an attempt to reduce the above-mentioned defects. However, this approach can be difficult to control.

Japanese Patent Reference JPS 54160535A is entitled, "Manufacture of Metal Mirror Blank by Laser Welding," and it is directed to manufacturing a metal mirror blank by welding a reflecting material on a base plate under vacuum by the irradiation of a laser beam to melt the weld portion of base plate and also a laser beam to dissolve the reflecting material. After vacuumizing a vacuum container, a first laser beam from a laser generator is split by reflecting mirrors and then focused by respective condensers. The reflecting material is dispensed at the focusing point of the beam by a delivery mechanism. The reflecting material is melted and drops onto a weld portion of a base plate. A second laser beam is positioned such that its focusing point is kept apart slightly from the point on the base plate by a defocusing device such that the weld portion is slightly melted. Thus, the reflecting material is welded to the weld portion and thereby the base plate and the reflecting material forms an alloy to form the high purity material surface as the upper blank surface. The base plate is moved by the driving device and the metal mirror blank is formed on the base plate.

It will be appreciated that this background description has been created by the inventors to aid the reader, and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims, and not by the ability of any disclosed feature to solve any specific problem noted herein.

SUMMARY

In embodiments, the present disclosure describes a laser cladding system. The system for laser cladding includes a laser apparatus, a chamber, and a pump system. The laser apparatus is configured to generate a laser beam. The chamber includes an interior surface that defines a cladding area within the chamber. The cladding area comprises a sealed volume. The chamber includes a window that is made from a laser-transparent material and is configured to allow the laser beam to pass therethrough into the cladding area. The pump system has a port in communication with the cladding area. The pump system is configured to selectively generate a vacuum pressure within the cladding area sufficient to evacuate gas from within the cladding area out through the port. The laser apparatus includes a laser head and a robotic laser motion system. The laser beam is emitted from the laser head. The robotic laser motion system is configured to selectively move the laser head such that the laser beam moves relative to a reference point within the chamber.

In another embodiment, a method for laser cladding is described. A component is placed within a cladding area defined by an interior surface of a chamber. The cladding area comprises a sealed volume. The chamber includes a window that is made from a laser-transparent material.

A vacuum pressure is generated within the cladding area sufficient to evacuate gas therefrom. A cladding material is deposited upon the component.

A laser beam is directed from outside the chamber through the window such that the laser beam melts the cladding material upon the component. The laser beam is moved relative to the component along a scanning path by using a robotic laser motion system to move a laser head from which the laser beam is emitted. The cladding material is allowed to solidify such that the cladding material is bonded to the component.

Further and alternative aspects and features of the disclosed principles will be appreciated from the following detailed description and the accompanying drawings. As will be appreciated, the systems and methods for laser cladding disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

Embodiments of systems and methods for laser cladding are disclosed herein. In embodiments, a laser cladding system constructed according to principles of the present disclosure can be used to apply a bead of molten cladding material upon a substrate surface of a component under controlled environmental conditions configured to reduce the occurrence and/or the size of pores within the cladding material layer formed when the bead solidifies.

In embodiments, a laser cladding system constructed according to principles of the present disclosure includes a vacuum chamber having a laser-transparent window and a pump system configured to selectively evacuate gas from within the chamber prior to using a laser beam generated from a laser apparatus disposed outside of the chamber to bond a cladding material to a substrate surface of a component placed within the chamber. In embodiments, the laser apparatus includes a robotic laser motion system configured to move the laser beam, and/or to adjust the orientation of the laser beam, relative to a component disposed within the vacuum chamber. In embodiments, an internal component manipulator can be provided which is configured to index the component inside the chamber relative to the laser beam. In embodiments, a material feeder apparatus can also be provided which is configured to selectively dispense cladding material therefrom upon the substrate of the component placed within the vacuum chamber.

In embodiments, a system for laser cladding constructed according to principles of the present disclosure can be used to perform a method for laser cladding that includes placing a component within a cladding area defined by an interior surface of a chamber and which comprises a sealed volume. The chamber includes a window that is made from a laser-transparent material. A vacuum pressure is generated within the cladding area sufficient to evacuate gas therefrom. In embodiments, the cladding area can be backfilled with an inert gas (e.g., helium) after evacuating the ambient gas therefrom.

A cladding material is deposited upon the component. A laser beam is directed from outside the chamber through the window such that the laser beam melts the cladding material upon the component. The laser beam is moved relative to the component along a scanning path by using a robotic laser motion system to move a laser head from which the laser beam is emitted. The cladding material is allowed to solidify such that the cladding material is bonded to the component.

Figure 1:
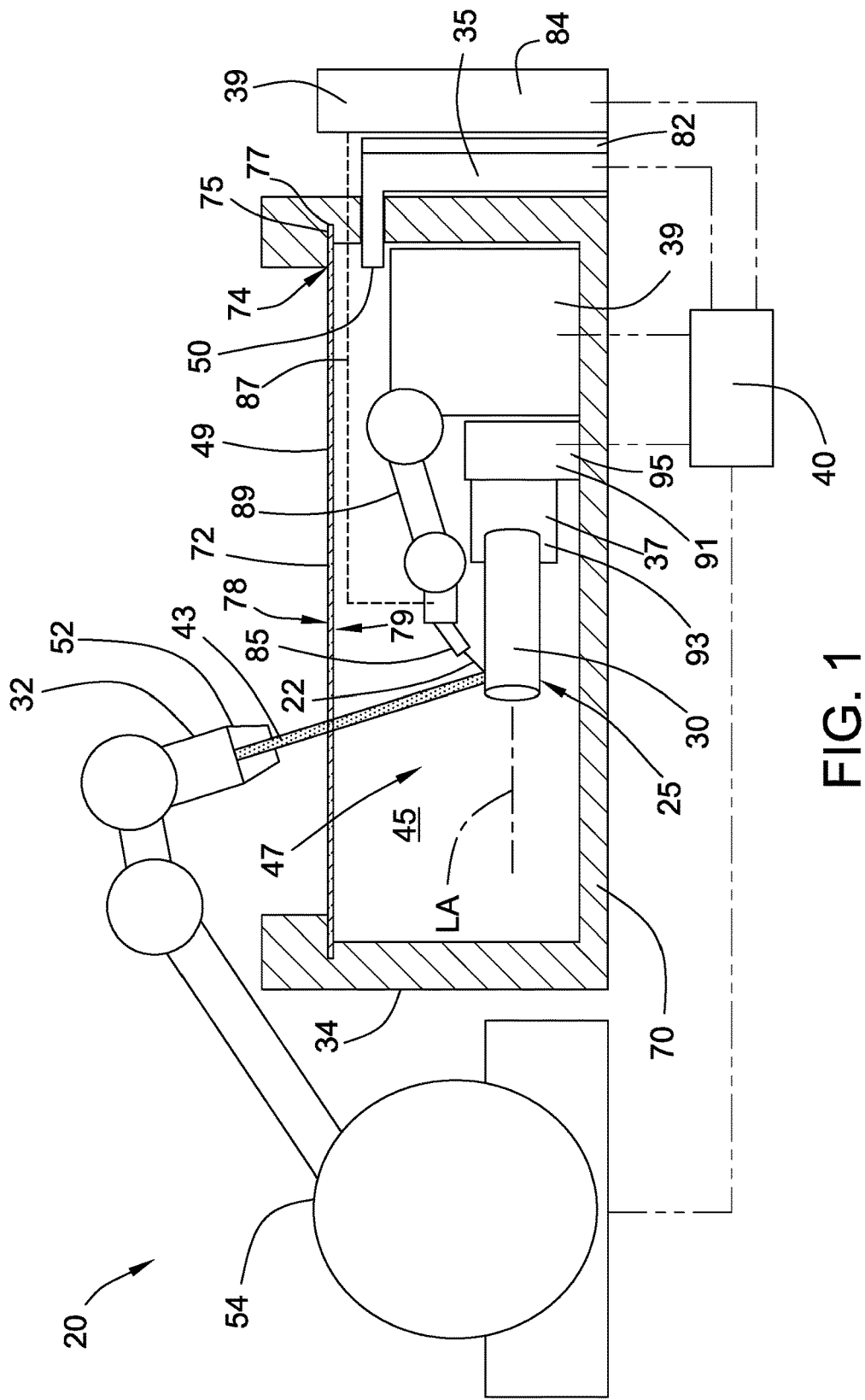
FIG. 1 is a diagrammatic side elevational view of an embodiment of system for laser cladding constructed in accordance with principles of the present disclosure.

Turning now to the Figures, there is shown in FIG. 1 an exemplary embodiment of a laser cladding system 20 constructed according to principles of the present disclosure. The laser cladding system 20 can be used to carry out methods following principles of the present disclosure for cladding a cladding material 22 to a substrate surface 25 of a component 30. The laser cladding system 20 can be used to manufacture, repair, and/or remanufacture the component 30. The component 30 of FIG. 1 is shown in the form of a simple shaft. It should be understood that, in other embodiments, the component 30 can have different forms.

The laser cladding system 20 of FIG. 1 includes a laser apparatus 32, a chamber 34, a pump system 35, a component fixture 37, a material feeder apparatus 39, and a controller 40. The laser cladding system 20 may also include a power supply (not shown) to power the laser cladding system 20. The component 30 is shown positioned within the component fixture 37 and held therein for further processing.

The laser apparatus 32 is configured to generate a laser beam 43. The chamber 34 includes an interior surface 45 that defines a cladding area 47 within the chamber 34. The cladding area 47 comprises a sealed volume. The chamber 34 includes a window 49 that is made from a laser-transparent material and is configured to allow the laser beam 43 to pass therethrough into the cladding area 47. The pump system 35 has a port 50 in communication with the cladding area 47. The pump system 35 is configured to selectively generate a vacuum pressure within the cladding area 47 sufficient to evacuate gas from within the cladding area 47 out through the port 50.

The laser apparatus 32 includes a laser head 52 and a robotic laser motion system 54. The laser beam 43 is emitted from the laser head 52. The robotic laser motion system 54 is configured to selectively move the laser head 52 such that the laser beam 43 moves relative to a reference point within the chamber 34.

The laser apparatus 32 is configured to direct the laser beam 43 onto the substrate surface 25 of the component 30 when the component 30 is held in the component fixture 37. The laser beam 43 is configured to melt the cladding material 22 deposited on the component 30. The laser beam 43 can comprise coherent light or more generally electromagnetic radiation. In embodiments, the laser apparatus 32 generates a laser beam having a wavelength within a predetermined range such that the window 49 is transparent to the laser radiation of the laser beam 43 passing therethrough.

In embodiments, the laser apparatus 32 can comprise any type of suitable laser that accommodates the necessary heat source. In embodiments, the laser apparatus 32 can comprise a continuous laser or a pulse laser. For example, in embodiments, the laser apparatus 32 can comprise a high-energy $CO_2$ laser; a ND:YAG laser, other type of solid-state, fiber-delivered laser; a femtosecond, nanosecond, or picoseconds laser; and any other type of laser capable of melting the cladding material 22 being used in a given application.

The laser head 52 includes a laser source that produces the laser beam 43. In the illustrated embodiment, the laser head 52 can direct the laser beam 43 onto the substrate surface 25 of the component 30. The laser head 52 is configured to direct and scan the focused spot of the laser beam 43 along the substrate surface 25 of the component 30 for a laser cladding process. In embodiments, the laser head 52 can comprise any suitable laser head, such as a laser scanning head that rasters the laser beam 43 across the substrate surface 25, for example.

In embodiments, the laser apparatus 32 includes an optic set. The optic set can be configured to direct the laser beam 43 into a laser beam shape. In embodiments, the optic set can be configured to produce any suitable beam shape, such as, circular, square, rectangular, or linear, for example.

The optic set can be configured to receive and direct the laser beam 43 along a scanning path, a length along which the laser beam 43 is intended to act upon the cladding material 22 to laser clad it to the component 30, and over each laser cladding cycle. In embodiments, the optic set can include multiple oscillating mirrors and stepper motors that are configured to mechanically control the mirrors to move or redirect the laser beam 43. In embodiments, piezoelectric actuators, servomotors, or pneumatic devices can be used to mechanically control or move the mirrors. In embodiments, the optic set can be fixed. In embodiments, the scanning path can substantially circumscribe the component 30. In embodiments, the scanning path can delineate a cladding area of the component. In embodiments, the cladding area of the component can substantially coincide with a wear path found on the component as a result of service in an intended application.

In embodiments, the laser apparatus 32 includes a beam splitter that splits an incident laser beam into a cleaning beam and a welding beam. The cleaning beam can be used to prepare the substrate surface 25 of the component 30 to receive the cladding material 22 by removing contaminants therefrom, and the welding beam can act as the laser beam 43 to melt the cladding material 22 deposited upon the cleaned substrate surface 25. The scanning paths of the cleaning beam and the welding beam can be coordinated so that the welding beam closely follows behind the cleaning beam along substantially the same scanning path.

In embodiments, the robotic laser motion system 54 of the laser apparatus 32 can include any suitable mechanism known to those skilled in the art for such a purpose. In embodiments, the robotic laser motion system 54 can comprise a one-dimensional linear or rotational motion system. In yet other embodiments, the robotic laser motion system 54 can comprise be configured to move the laser head 52 such that the laser beam 43 moves relative to a reference point within the chamber 34 with at least two degrees of freedom. For example, in embodiments, the robotic laser motion system 54 can comprise a six-axis robot.

The robotic laser motion system 54 can be configured to selectively provide relative movement between the laser beam 43 emitted from the laser head 52 and the component 30 mounted in the component fixture 37 within the chamber 34. The robotic laser motion system 54 can move the laser beam 43 over the scanning path to form a molten bead of the cladding material 22 upon the component 30 along the scanning path. The robotic laser motion system 54 can move the laser beam 43 relative to the component 30 such that the scanning path produces a substantially contiguous layer of the cladding material 22 over a predetermined area of the substrate surface 25 of the component 30.

Referring still to FIG. 1, the vacuum chamber 34 can be used to create a fully-controlled atmosphere within which a laser cladding process can be performed. In embodiments, the vacuum chamber 34 includes a transparent material on a face that permits the laser beam 43 to pass through, unabated. In the illustrated embodiment, the window 49 is provided for that purpose.

The window 49 of the chamber 34 can be made from any suitable material. For example, in embodiments, the window 49 is made from glass, silica, or other suitable material which is transparent to the wavelength of the laser beam 43.

In the illustrated embodiment, the chamber 34 includes a body 70 and a panel 72. In the illustrated embodiment, the panel 72 includes the window 49. The body 70 in this embodiment comprises a box-like structure that defines a component opening 74. The component opening 74 is configured to permit the component 30 to pass therethrough for being placed within the cladding area 47. The panel 72 is secured to the body 70 such that the panel 72 can be disposed with respect to the body 70 to occlude the component opening 74. The panel 72 can be placed in sealing relationship with the body 70 such that the cladding area 47 comprises a sealed volume to permit the pump system 35 to generate a vacuum pressure within the cladding area 47.

The panel 72 in the illustrated embodiment of FIG. 1 can be disposed within a groove 75 defined within the body 70 of the chamber 34 such that the panel 72 is sealingly engaged with the body 70. In embodiments, the panel 72 can include a perimeter 77, a pair of opposing, generally-planar faces 78, 79, and a seal member (not shown) circumscribing both faces 78, 79 of the panel adjacent the perimeter 77. The seal members can be configured to sealingly engage the body 70 of the chamber 34 to create a substantially vacuum-tight seal therebetween. In embodiments, the seal member can have any suitable form. For example, in embodiments, the seal member is in the form of a gasket or o-ring. In other embodiments, the panel 72 can have a different configuration to provide a seal between the panel 72 and the body 70 to help the pump system 35 generate a vacuum pressure within the cladding area 47.

The panel 72 can be removed from the body 70 in order to install the component 30 in the component fixture 37 and to allow the component 30 mounted in the component fixture 37 to be removed therefrom. In embodiments, the panel 72 is removably secured to the body 70 via a hinged connection and a locking clasp. In other embodiments, the laser cladding system 20 can include a robotic component transfer system to install and/or remove the component 30 from within the cladding area 47 of the chamber 34.

Referring still to FIG. 1, the pump system 35 can be configured to remove ambient gas within the cladding area 47 of the chamber 34. The pump system 35 is configured to selectively generate a vacuum pressure within the cladding area 47 sufficient to evacuate gas from within the cladding area 47 out through the port 50. In embodiments, the pump system 35 can be configured to maintain the cladding area 47 under vacuum pressure, or pressure below the ambient pressure outside of the chamber 34, during a cladding process. In embodiments, the port 50 of the pump is in sealed communication with the cladding area 47 of the chamber 34 such that vacuum pressure is maintained within the cladding area 47 for an amount of time after the pump ceases to operate.

In embodiments, the pump system 35 can comprise any suitable pump system configured to evacuate gas from within the cladding area 47 of the chamber 34. In embodiments, the pump system 35 is configured to evacuate gas from within the cladding area 47 of the chamber 34 such that the amount of oxygen within the cladding area 47 of the chamber 34 is reduced. In embodiments, the pump system 35 is configured to evacuate gas within the cladding area 47 of the chamber 34 such that the propensity of the cladding material 22 and/or the substrate surface 25 of the component 30 to oxidize is reduced. In embodiments, the pump system 35 is configured to evacuate gas from within the cladding area 47 of the chamber 34 such that the cladding area within the chamber is substantially free of oxygen.

In embodiments, the pump system is configured to maintain a pressure within the cladding area 47 of the chamber 34 that is less than the ambient pressure just outside of the chamber 34. In other embodiments, the pump system can be configured to allow the pressure within the cladding area 47 to return to an equilibrium state with the ambient pressure outside of the chamber 34 after a predetermined amount of time has elapsed.

In embodiments, the pump system 35 includes a supply of inert gas 82. The pump system 35 can be configured to selectively backfill the cladding area 47 with an amount of inert gas from the supply of inert gas 82 after evacuating gas from within the cladding area 47. In embodiments, the supply of inert gas 82 can comprise any suitable inert gas can be used, such as, argon, nitrogen, or helium, for example.

In embodiments, after backfilling the chamber 34 with an inert gas, the pump system 35 can be operated again to reduce the pressure within the cladding area 47 of the chamber 34 and subsequently again backfill the cladding area with the inert gas. In embodiments, the pump system 35 can be operated through multiple cycles of generating a vacuum pressure within the cladding area 47 of the chamber and then backfilling the cladding area 47 with the inert gas to even further reduce the concentration of oxygen and/or other impurities within the cladding area 47 in an iterative fashion.

In embodiments, the pump system 35 can be configured to generate a vacuum pressure that is in a suitable range for the particular laser cladding process contemplated. In embodiments, a suitable range for the vacuum pressure generated by the pump system is a range between an absolute vacuum and the ambient pressure outside of the chamber 34 (or any suitable subset thereof in other embodiments). In embodiments, the target range of the vacuum pressure generated by the pump system 35 can vary depending upon the particular characteristics of the component 30 and/or materials used in a given laser cladding process (such as the particular material(s) of the substrate surface 25 of the component 30 and the cladding material 22).

In embodiments, the pump system 35 can be configured to maintain a negative pressure within the cladding area 47 (relative to the ambient pressure outside of the chamber 34) after the amount of inert gas has been backfilled into the cladding area 47. In other embodiments, the pump system 35 can be configured to allow the pressure within the cladding area 47 to return to an equilibrium state with the ambient pressure outside of the chamber 34 after the amount of inert gas has been backfilled into the cladding area 47.

In embodiments, the pump system 35 can generate a vacuum pressure within the cladding area 47 of the chamber 34 sufficient to evacuate gas therefrom as described above. Thereafter, the pump system can positively displace an amount of the inert gas from the supply of inert gas 82 and deliver it to the cladding area 47 of the chamber 34. In embodiments, the amount of inert gas delivered into the cladding area 47 of the chamber 34 by the pump system 35 is sufficient to raise the concentration of the inert gas within the cladding area 47 to a predetermined threshold level. In embodiments, the pump system 35 can include any suitable pumping arrangement, as will be readily appreciated by one skilled in the art, to accomplish both generating vacuum pressure within the cladding area 47 during the evacuation phase and delivering the amount of inert gas into the cladding area 47 during the backfill phase.

Referring still to FIG. 1, the material feeder apparatus 39 can be configured to direct the cladding material 22 toward the substrate surface 25 of the component 30 when the component 30 is held in the component fixture 37. The material feeder apparatus 39 includes a supply of cladding material 84 disposed outside of the chamber 34 and a feedstock discharge end 85 disposed within the cladding area 47 of the chamber 34. The material feeder apparatus 39 is configured to selectively convey the cladding material 22 from the supply of cladding material 84 to the feedstock discharge end 85 and to dispense the cladding material 22 from the feedstock discharge end 85 onto the substrate surface 25 of the component 30.

In the illustrated embodiment, a conduit 87 is interposed between the feedstock discharge end 85 and the supply of cladding material 84. The conduit 87 is configured to convey the cladding material 22 from the supply of cladding material 84 to the feedstock discharge end 85. In embodiments, multiple conduits can be interposed the supply of cladding material 84 and the feedstock discharge end 85 to convey the cladding material 22 to the feedstock discharge end 85 along multiple paths. Each conduit 87 can be in sealing relationship with the chamber 34 such that the conduit 87 extends through the body 70 of the chamber 34 with a vacuum-tight, pressure-resistant seal therebetween.

In embodiments, any suitable material feeder apparatus 39 can be used to deliver the cladding material 22, such as a side-fed feedstock or a coaxial feedstock, for example. In embodiments, the material feeder apparatus 39 includes any suitable mechanism known to those skilled in the art for conveying the cladding material 22 from the supply of cladding material 84 disposed outside the chamber 34 to the feedstock discharge end 85 disposed within the chamber 34. In embodiments, the material feeder apparatus 39 is configured to heat the cladding material 22 within the storage area of the supply of cladding material 84 and/or as the cladding material is being conveyed from the supply of cladding material 84 to the feedstock discharge end 85.

The feedstock discharge end 85 can be configured to discharge the cladding material 22 supplied from the supply of cladding material 84 for fusing a cladding coating on the substrate surface 25 of the component 30. In embodiments, the material feeder apparatus 39 can be configured to dispense the cladding material 22 from the feedstock discharge end 85 such that the cladding material 22 is deposited onto the component 30 coincident with the focal point of the laser beam 43. The material feeder apparatus 39 can be configured to feed the cladding material 22 into a beam spot of the laser beam 43 upon the substrate surface 25 of the component 30 substantially continuously along the scanning path.

In embodiments, the feedstock discharge end 85 can be in the form of a nozzle. In embodiments, the feedstock discharge end 85 can be configured to deposit the cladding material 22 in a layer having a predetermined thickness. For example, in embodiments, the cladding material 22 can be deposited in a layer approximately one to two millimeters thick. In other embodiments, the feedstock discharge end 85 can have any suitable form, as will be appreciated by one skilled in the art.

In embodiments, the material feeder apparatus 39 includes a robotic feeder motion system 89. The robotic feeder motion system 89 can be configured to move the feedstock discharge end 85 relative to the component 30 when the component 30 is supported by the component fixture 37.

In embodiments, the robotic feeder motion system 89 can comprise a one-dimensional linear or rotational motion system. In yet other embodiments, the robotic feeder motion system 89 can comprise be configured to move the feedstock discharge end 85 such that the feedstock discharge end 85 moves relative to the component 30 mounted in the component fixture 37 within the chamber 34 with at least two degrees of freedom. For example, in embodiments, the robotic feeder motion system 89 can comprise a six-axis robot.

In the illustrated embodiment, the material feeder apparatus 39 is configured to provide the cladding material 22 in the form of a powder. In other embodiments, the material feeder apparatus 39 can be configured to supply the cladding material 22 in the form of an elongate member—such as a wire or a strip, for instance—for application to the substrate surface 25 of the component 30.

In other embodiments, the cladding material 22 can be provided on the substrate surface 25 of the component 30 using any system and method known in the art. For example, in embodiments, a paste-like cladding material can be placed on the component 30 before gas within the cladding area 47 of the chamber 34 is evacuated.

In embodiments, the cladding material 22 can be any suitable material for a laser cladding process, such as a suitable metal. For example in embodiments, the cladding material 22 can be an iron-based steel alloy (stainless steel, tungsten carbide, etc.) and/or a nickel based alloy. In one example, a suitable steel cladding material for cladding a component made from forged, carbon steel can be a mixture or uniform composition of hard facing tool steel materials.

In embodiments, the cladding material 22 is similar to the base material of the component 30 as found on the substrate surface 25. In other embodiments, the cladding material 22 is different from the base material of the component 30. In embodiments of such cases, the cladding material 22 is compatible with the base material of the component 30 at the substrate surface 25 such that the cladding material applied to the substrate surface 25 metallurgically bonds with the substrate surface 25 of the component 30 after undergoing a laser cladding process according to principles of the present disclosure. In embodiments of such cases, the cladding material 22 can have at least one enhanced material property relative to the base material of the substrate surface 25 of the component 30, such as, wear resistance, fatigue strength, and the like.

Referring still to FIG. 1, the component fixture 37 is disposed within the cladding area 47 of the chamber 34. The component fixture 37 is configured to support the component 30.

In embodiments, the component fixture 37 includes a robotic component motion system 91. The robotic component motion system 91 is configured to move the component 30 supported by the component fixture 37 relative to the laser beam 43 and/or the feedstock discharge end 85 of the material feeder apparatus 39. In embodiments, the controller 40 can be configured to manipulate the robotic laser motion system 54, the robotic feeder motion system 89, and/or the robotic component motion system 91 to manipulate the location of the laser beam 43 relative to the component 30 and the deposition site of the cladding material 22 relative to the component 30. In embodiments, the controller 40 can be configured to coordinate the movement of the robotic motion systems 54, 89, 91 so that they act in a coordinated fashion to remain coincident during a laser cladding process.

In embodiments, the robotic component motion system 91 can comprise a one-dimensional linear or rotational motion system. In yet other embodiments, the robotic component motion system 91 can comprise be configured to move the component 30 such that the component 30 moves relative to the laser beam 43 emitted from the laser apparatus 32 and/or the cladding material 22 discharged from the within the chamber 34 material feeder apparatus 39 with at least two degrees of freedom. For example, in embodiments, the robotic component motion system 91 can comprise a six-axis robot.

In the embodiment illustrated in FIG. 1, the component fixture 37 is in the form of a spindle 93 having a three-way chuck configured to securely clamp the component 30 for mounting the component 30 to the chuck of the spindle 93. The robotic component motion system 91 is in the form of a motor 95 that is selectively activated by the controller 40 to rotate the spindle 93 (and thus the component 30 mounted thereto) about a longitudinal axis LA of the spindle. During a laser cladding operation, the component 30 can be mounted to the spindle 93, and the robotic component motion system 91 can be operate to rotate the substrate surface 25 of the component 30 about the longitudinal axis LA relative to the laser beam 43 and/or the feedstock discharge end 85 of the material feeder apparatus 39. In embodiments, the robotic component motion system 91 can be configured to selectively translate the component 30 over a range of travel along at least one axis (e.g., the longitudinal axis LA) relative to a reference point within the chamber 34. In embodiments, the laser head 52 and/or the feedstock discharge end 85 of the material feeder apparatus 39 can be moved while maintaining the component 30 in a fixed position. In embodiments, the component fixture 37 can have different forms.

In the illustrated embodiment of FIG. 1, the controller 40 is in communication with, and is configured to regulate the operation of, the laser apparatus 32, the component fixture 37, the material feeder apparatus 39, and the pump system 35. The controller 40 can be in communication with the various components of the laser cladding system 20 via any suitable technique, such as a wired electrical connection or wirelessly as will be appreciated by one skilled in the art.

In embodiments, the controller 40 includes at least one processor for executing computer-executable instructions. In embodiments, the processor can be implemented in any suitable form, such as a computer, server, or manufacturing machine (e.g. a computer numerical control (CNC) machine). It will be appreciated by one skilled in the art that the controller 40 can include any of a number of commercially-available processors. The controller 40 can include, or be associated with, a memory having a non-transitory computer readable medium that can be used to store information and/or executable software modules that can be executed by the processor. Exemplary information that can be stored in the memory includes operating conditions; design limits; performance characteristics or specifications of the laser apparatus 32, the component fixture 37, the material feeder apparatus 39, and/or the pump system 35; operational instructions, and corresponding quality parameters of the component 30 (e.g., of the substrate surface 25 and the finished surface of the cladding layer).

In embodiments, various other known circuits can be associated with the controller 40, such as, power supply circuitry, signal-conditioning circuitry, solenoid driver circuitry, communication circuitry, and other appropriate circuitry. Moreover, the controller 40 can be configured to communicate with other components of the laser apparatus 32, the component fixture 37, the material feeder apparatus 39, and the pump system 35 (e.g., with motors, actuators, sensors, switches, etc. thereof) via either wired or wireless transmission.

The controller 40 of the laser cladding system 20 can be programmed to control or instruct the pump system 35 to selectively evacuate gas from within the cladding area 47 of the chamber 34. For example, in embodiments, once the controller 40 receives a signal to initiate a laser cladding process, the controller 40 can direct the pump system 35 to operate to evacuate gas from the cladding area 47 of the chamber 34. In embodiments, the controller 40 can be configured to operate the pump system 35 after receiving an initiate command only if it has received an indication that the component 30 is installed or supported by the component fixture 37. In embodiments, after the pump system 35 has evacuated gas from the cladding area 47 within the chamber 34 via vacuum pressure, the controller 40 can direct the pump system 35 to backfill the cladding area 47 with an amount of inert gas from the supply of inert gas 82.

The controller 40 of the laser cladding system 20 can be programmed to control or instruct the laser head 52 to direct the laser beam 43 along the scanning path during a laser cladding process. Each time the laser beam 43 is directed over the scanning path can be considered a pass. In embodiments, the laser cladding process can comprise a single pass. More specifically, in order to melt the cladding material 22 during the laser cladding process, the laser beam 43 is directed only once over the scanning path. In other embodiments, the controller 40 can be configured to move the laser head 52 over multiple passes of the scanning path.

In embodiments, the controller 40 can be programmed with a pre-cleaning module and a beading module. In embodiments, the pre-cleaning module comprises a computer program configured to control the laser head 52 to direct the laser beam 43 over a pre-clean scanning path to remove impurities from the substrate surface 25 prior to using the laser apparatus 32 to clad the component 30 with the cladding material 22. In embodiments, the beading module comprises a computer program configured to control the laser head 52 to direct the laser beam 43 over a scanning path to form a molten bead of the cladding material 22 at the substrate surface 25 of the component 30. In embodiments, the pre-clean scanning path is substantially the same as the scanning path. In embodiments, the controller 40 is configured to direct the laser beam 43 over the scanning path within a predetermined amount of time after traversing the pre-clean scanning path.

After the laser beam 43 completes the traverse of the scanning path, the beading module of the controller 40 can be configured to control or instruct the laser head 52 to direct the laser beam 43 to move over a second scanning path to form the next molten bead. In embodiments, the second scanning path can be adjacent to, or contiguous with, the bead of cladding material produced by the first scanning path. In embodiments, the second scanning path is overlying the first scan path. The beading module of the controller 40 can be configured to control or instruct the laser beam 43 to move over each scanning path of the laser cladding cycle.

In embodiments, the controller 40 can be programmed to control a delivery supply of the cladding material 22 over each scanning path. In embodiments, the controller 40 can be programmed to move the component 30 supported by the component fixture 37 relative to the laser beam 43 and/or the feedstock discharge end 85 of the material feeder apparatus 39. In embodiments, the controller 40 can be programmed to move the feedstock discharge end 85 of the material feeder apparatus 39 relative to the laser beam 43 and/or component 30 supported by the component fixture 37. In embodiments, the controller 40 can be programmed to control or instruct the material feeder apparatus 39 to move the feedstock discharge end 85 along the scanning path and to convey the cladding material 22 from the supply of cladding material 84 to the feedstock discharge end 85 and to dispense the cladding material 22 from the feedstock discharge end 85 onto the substrate surface 25 of the component 30 as the feedstock discharge end 85 moves along the scanning path.

Accordingly, the delivery of the cladding material 22 can coincide with the movement of the laser beam 43 over the scanning path. The laser beam 43 melts the substrate surface 25 of the component 30 and the cladding material 22 deposited along the scanning path to form a molten bead of the cladding material 22 upon the component 30 over the scanning path. Upon solidifying, the cladding material 22 forms a cladding layer that is metallurgically bonded to the base material of the component 30 and/or the previously-deposited cladding material 22 bonded to the component 30.

Figure 2:
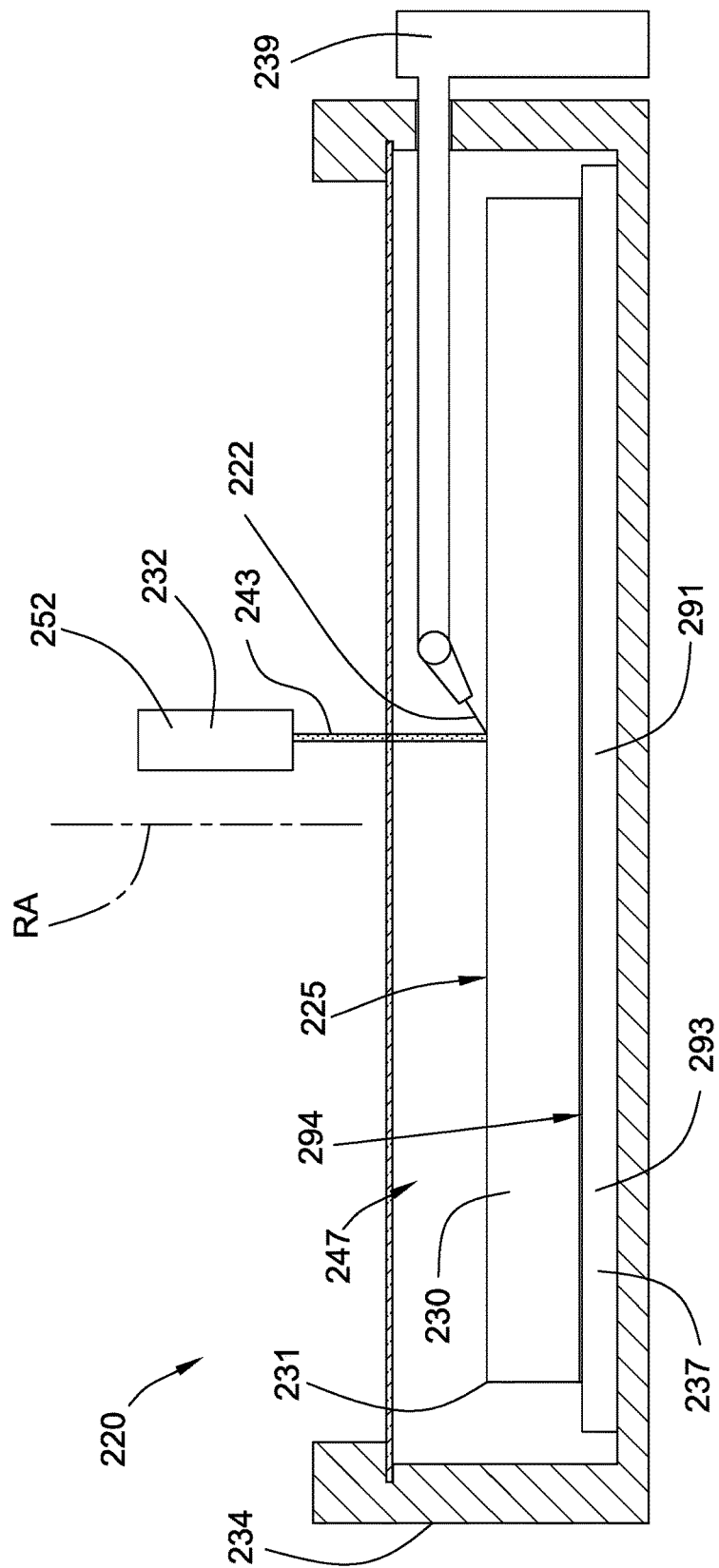
FIG. 2 is a diagrammatic side elevational view of another embodiment of system for laser cladding constructed in accordance with principles of the present disclosure.
Figure 3:
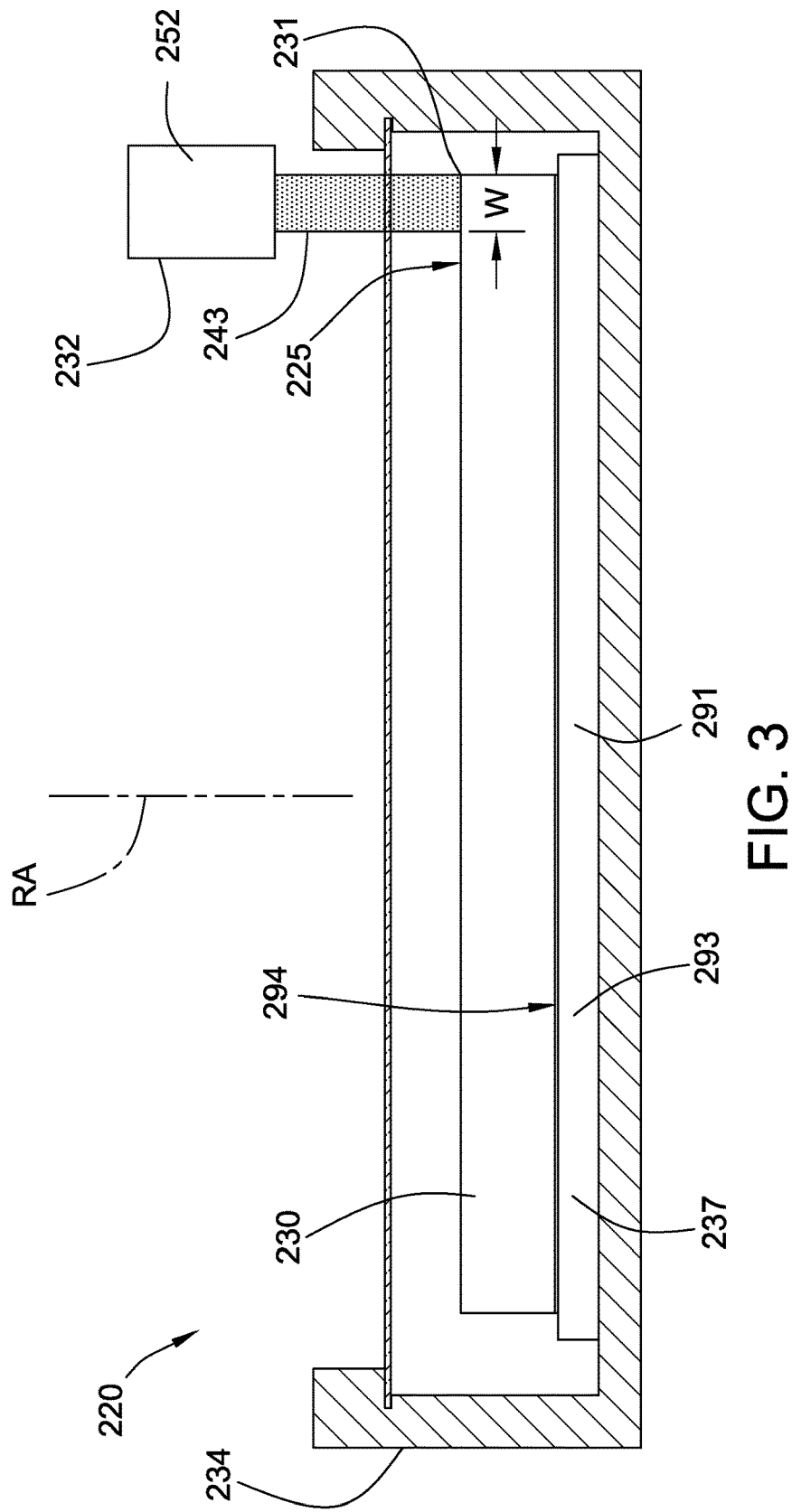
FIG. 3 is a diagrammatic front elevational view of the laser cladding system of FIG. 2.

Referring to FIGS. 2 and 3, another embodiment of a laser cladding system 220 is shown. The laser cladding system 220 can be used to carry out methods following principles of the present disclosure for cladding a cladding material 222 to a substrate surface 225 of a component 230. The laser cladding system 220 includes a laser apparatus 232, a chamber 234, a pump system (not shown), a component fixture 237, a material feeder apparatus 239, and a controller (not shown). The laser cladding system 220 may also include a power supply (not shown) to power the laser cladding system 220. A component 230 in the form of a seal ring is shown positioned upon the component fixture 237 and held therein for further processing.

Referring to FIGS. 2 and 3, the laser apparatus 232 is configured to produce a laser beam 243 having a linear shape with a predetermined width W (see FIG. 3). The laser apparatus 232 of FIGS. 2 and 3 can be similar in other respects to the laser apparatus 32 of FIG. 1, including, for example, its robotic laser motion system.

The component fixture 237 of FIGS. 2 and 3 is in the form of a support disc 293 which is configured to support the component 230 upon a planar top surface 294 of the support disc 293. In embodiments, one or more locating pins and/or cleat members can be mounted to the support disc 293 to fix the position of the component 230 relative to the support disc 293. The robotic component motion system 291 is in the form of a suitable motor (not shown) that is selectively activated by the controller 40 to rotate the support disc 293 (and thus the component 230 mounted thereto) about a rotational axis RA of the support disc 293 which is substantially perpendicular to the planar top surface 294 of the support disc. In other embodiments, the component fixture 237 can have yet a different form that includes other means of securing and/or moving the component 230.

The laser head 252 of the laser apparatus 232 can be moved relative to the component 230 resting upon the support disc 293 such that the laser beam 243 is positioned at an outer perimeter 231 of the component 230 (see FIG. 3). In embodiments, the beam shape of the laser beam 243 can be positioned with respect to the component 230 such that the width of the beam shape extends along an axis (LBA) that extends through the geometric center (GC) of the component 230 (see FIG. 4).

Figure 4:
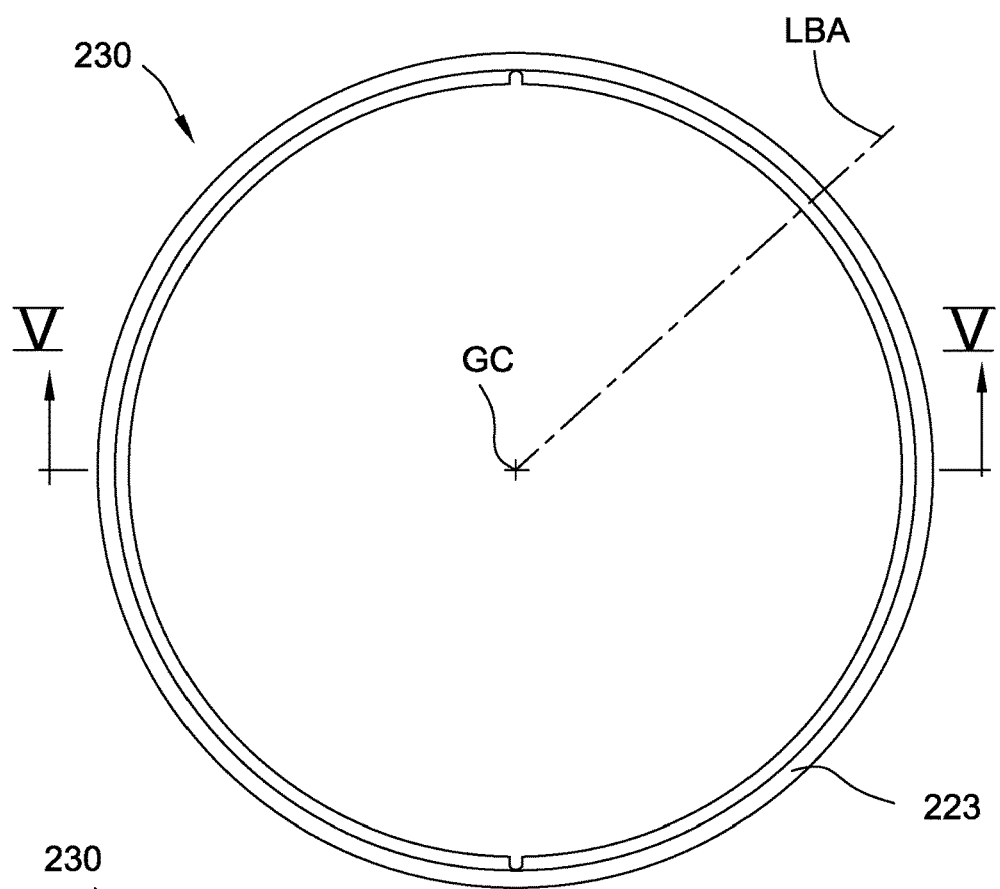
FIG. 4 is a top plan view of an embodiment of a component suitable for use with laser cladding systems and methods according to principles of the present disclosure.
Figure 5:
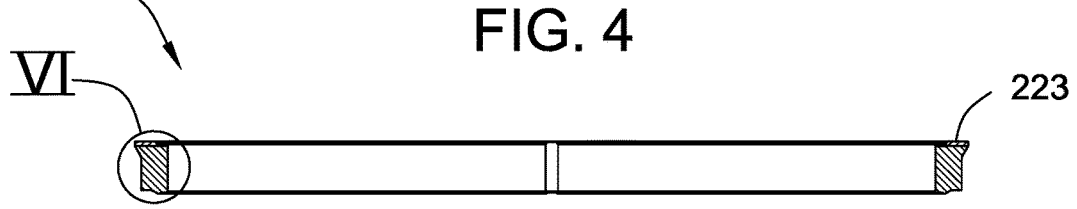
FIG. 5 is a cross-sectional view, taken along line V-V in FIG. 4, of the component of FIG. 4.
Figure 6:
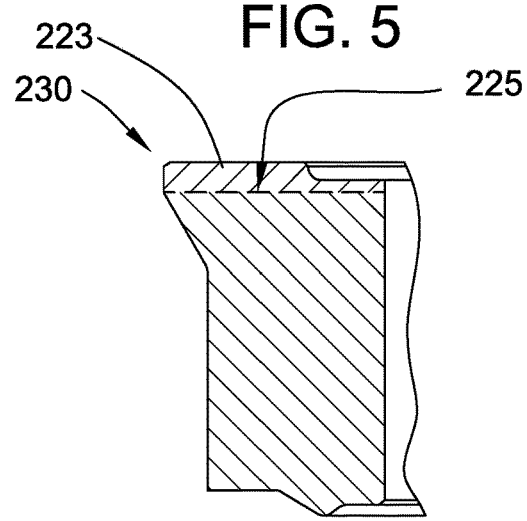
FIG. 6 is an enlarged, detail view taken from FIG. 5, as indicated by circle VI therein.

Referring to FIG. 2, the material feeder apparatus 239 can be operated to selectively dispense the cladding material 222 substantially coincident with the spot where the laser beam 243 strikes the substrate surface 225 of the component 230. The support disc 293 can be rotated about the rotational axis RA such that the laser beam 243 completes a scanning path that circumscribes the outer perimeter 231 of the component 230. In embodiments, the component 230 can be an annular seal ring, such as is shown in FIGS. 4-6, for example. The material feeder apparatus 239 can continuously deposit the cladding material 222 upon the substrate surface 225 of the component 230 as it rotates about the component rotational axis RA to apply a layer of the cladding material 222 that is annular. The laser apparatus 232 can be operated to melt the cladding material 222 deposited upon the component 230 after the pump system has evacuated gas from within the cladding area 247 of the chamber 234.

The laser cladding system 220 of FIGS. 2 and 3 can be similar in other respect to the laser cladding system 20 of FIG. 1. For example, the chamber 234, the pump system, and the controller of the laser cladding system 220 of FIGS. 2 and 3 can be similar to those described in connection with the laser cladding system 20 of FIG. 1.

Referring to FIGS. 4-6, the component 230 can be in the form of a seal ring. The seal ring 230 can be made from any suitable material, such as a metal alloy, for example. In embodiments, the seal ring 230 can be made from a suitable nickel alloy or iron alloy.

Referring to FIGS. 3 and 6, the material feeder apparatus 239 can be operated to discharge the cladding material 222 therefrom upon the substrate surface 225 of the seal ring 230, which is annular, to apply a layer of cladding material 223 that in turn is also annular (see FIGS. 4 and 5, as well). The laser beam 243 can melt the layer of cladding material 223 to metallurgically bond the layer of cladding material 223 to the substrate surface 225 of the seal ring 230.

The cladding material and the base material of the component 230, as well as previously-deposited but solidified cladding material forming an adjacent bead, can melt and together mix in a melt pool. It should be appreciated therefore that the laser beam 243 can impinge upon a part of previously-deposited bead and also a part of the substrate surface 225 that is not yet clad and is formed of the base material. Once the newly-deposited bead is complete, the laser apparatus 232 and/or the component 230 can be adjusted to reposition the laser beam 243 relative to the component 230. Formation of another bead can continue until the layer of cladding material 223 extends completely circumferentially around the top substrate surface 225 of the component 230.

After the layer of cladding material 223 solidifies, the layer of cladding material and the base material of the substrate surface 225 of the component form a metallurgical bond therebetween. The layer of cladding material 223 can be subjected to machining to bring the component 230 within a target range for the specification value for the exterior surface of the component 230, including the layer of cladding material.

Although the illustrated embodiment depicts the component 230 in the form of a seal ring, this is only exemplary. It will be apparent to one skilled in the art that various aspects of the disclosed principles relating to the laser cladding of components can be used with a variety of different types of components. Accordingly, one skilled in the art will understand that, in other embodiments, a laser cladding system can be used in a laser cladding process following principles of the present disclosure to manufacture, repair, or remanufacture different types of components.

In embodiments of a method for laser cladding following principles of the present disclosure, a layer of cladding material can be bonded to a substrate surface of a component in a controlled environment. In embodiments, the controlled environment is created within a vacuum chamber by operating a vacuum pump to evacuate ambient air within the vacuum chamber. The vacuum chamber can be maintained under vacuum pressure while the laser beam, which is directed from outside the chamber through a laser-transparent window, melts cladding material deposited upon the component and the substrate surface of the component.

Figure 7:
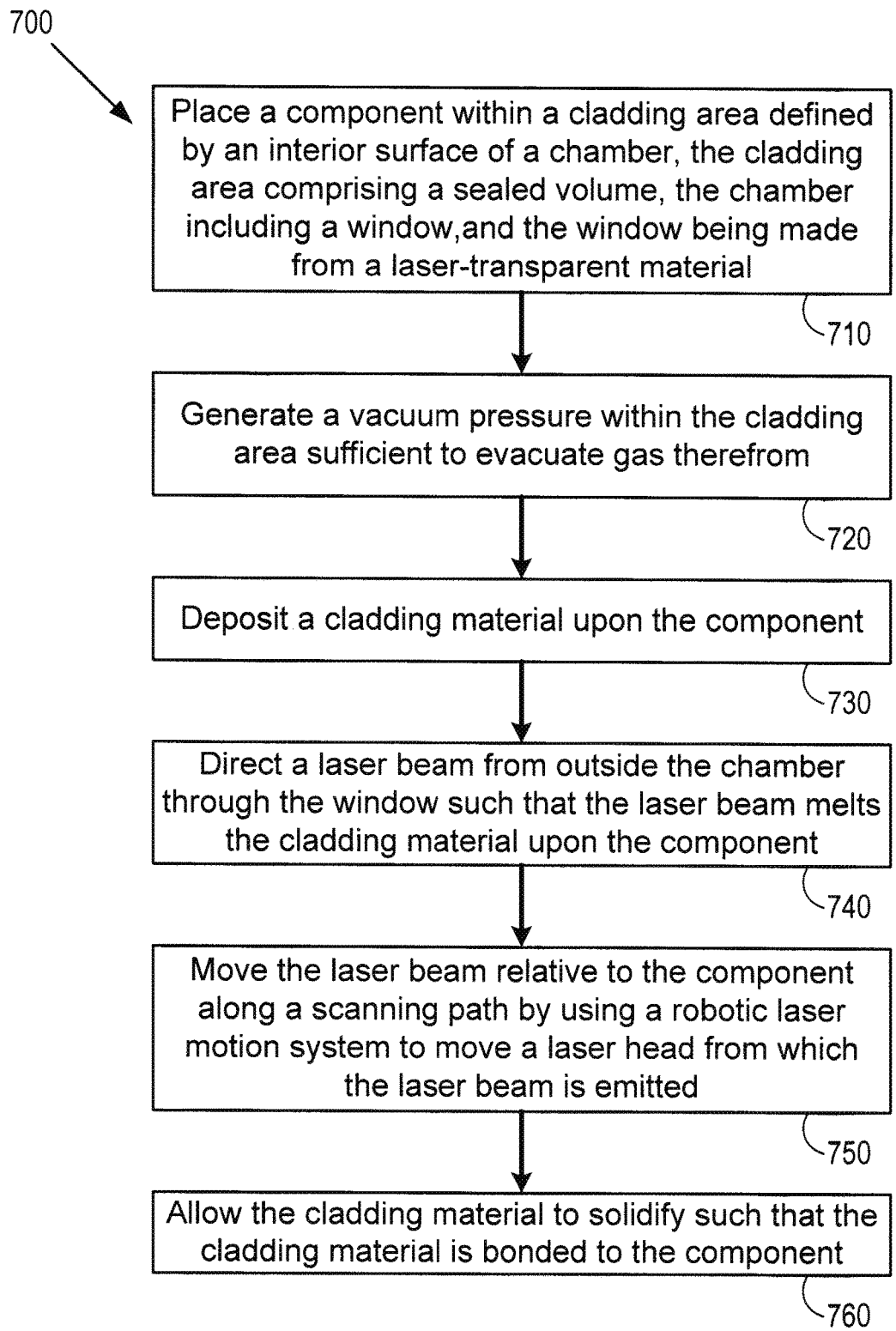
FIG. 7 is a flowchart illustrating steps of an embodiment of a method for laser cladding following principles of the present disclosure.

Referring to FIG. 7, steps of an embodiment of a method 700 for laser cladding following principles of the present disclosure are shown. In embodiments, a method for laser cladding following principles of the present disclosure can be used to make, repair or remanufacture any embodiment of a component according to principles discussed herein.

In the method 700 for laser cladding, a component is placed within a cladding area defined by an interior surface of a chamber (step 710). The cladding area comprises a sealed volume. The chamber includes a window that is made from a laser-transparent material. In embodiments, the step of placing the component within the cladding area (step 710) can include passing the component through a component opening defined by a body of the chamber and removably securing a panel to the body after the component is placed within the cladding area such that the panel occludes the component opening and is in sealing relationship with the body.

Even where the materials themselves are not recently heated or melted, the formation of oxide contaminants upon surfaces of material exposed to an oxidative environment will tend to occur over time where oxygen is present in the environment. Oxide contaminants can form upon recently-deposited cladding material. Oxide contamination can reduce the integrity of the welding process, and in the case of a layer of cladding material, can result in voids and other imperfections that can create or propagate cracks and/or lead to the cladding layer delaminating from the substrate surface of the component. Accordingly, in step 720, a vacuum pressure is generated within the cladding area sufficient to evacuate gas therefrom. In embodiments, the step of generating a vacuum pressure within the cladding area can be used to evacuate oxygen within the chamber such that the propensity of the cladding material and/or the substrate surface of the component to oxidize is reduced. In embodiments, the step of generating a vacuum pressure within the cladding area can be used to evacuate substantially all of the oxygen from the cladding area within the chamber.

A cladding material is deposited upon the component (step 730). In embodiments, the step of depositing the cladding material upon the component (step 730) includes dispensing the cladding material from a feedstock discharge end of a material feeder apparatus. The feedstock discharge end is disposed within the cladding area of the chamber. In embodiments, a supply of cladding material, from which the cladding material is conveyed to the feedstock discharge end, is disposed outside the vacuum chamber.

In embodiments of a method for laser cladding following principles of the present disclosure, the method can also include, after evacuating the cladding area, backfilling the cladding area with an amount of inert gas. In embodiments, any suitable inert gas can be used, such as, argon, nitrogen, or helium, for example.

A laser beam is directed from outside the chamber through the window such that the laser beam melts the cladding material upon the component (step 740). The laser beam is moved relative to the component along a scanning path by using a robotic laser motion system to move a laser head from which the laser beam is emitted (step 750). The cladding material is allowed to solidify such that the cladding material is bonded to the component (step 760).

In embodiments, the step of depositing the cladding material upon the component (step 730) includes moving the feedstock discharge end relative to the component such that the cladding material is deposited along a scanning path, and the step of directing the laser beam (step 740) includes moving the laser beam relative to the component such that the laser beam follows along the scanning path. In embodiments, melting the cladding material includes melting the cladding material such that the melted cladding material, upon solidifying, metallurgically bonds to the base material of the component.

In embodiments, the step of moving the laser beam relative to the component along the scanning path (step 750) includes translating the laser beam relative to the component along the scanning path. In embodiments, the step of moving the laser beam relative to the component along the scanning path (step 750) includes using a robotic component motion system to move the component. In at least some of such embodiments, the robotic component motion system rotates the component about a component rotational axis.

In embodiments, the component is manufactured from a suitable material, such as a metal alloy. In embodiments, the component is made from a base material. In embodiments, the cladding material is different from the base material. In embodiments, the component is made at least in part from a substrate material which is different from the cladding material. The cladding material is bonded to the substrate material.

For example, in embodiments, the cladding layer can be made from a surfacing material that is harder than the base material used to manufacture the component. The cladding layer can be disposed over a coverage area that is oriented over a wear path associated with intended use of the component. In other embodiments, the cladding material is substantially the same as the base material.

In embodiments of a method for laser cladding following principles of the present disclosure, the method can also include, before the step of directing the laser beam (step 740), using a cleaning beam to impinge upon a surface to be clad such that the surface is substantially decontaminated and substantially no new oxide recontamination has time to occur before the step of directing the laser beam (step 740) occurs. In embodiments, decontaminating the surface can include volatilizing contaminants from the substrate surface of the component and from the cladding material of a previously-deposited bead.

In embodiments, a robust metallurgical bond between the cladding material and the base material of the component is obtained, and the layer of cladding material is substantially nonporous such that the layer of cladding material has acceptable resistance to cracking and/or delamination. In embodiments, the cladding layer has only a limited number of pores of about 0.010 millimeters (10 microns) or greater in a given cladding layer area.

In embodiments of a method for laser cladding following principles of the present disclosure, the method can also include splitting an incident laser beam into a cleaning beam and a welding beam, directing the cleaning and welding beams toward the component such that the cleaning and welding beams impinge upon a substrate surface of the component; moving the cleaning and welding beams relative to the component along the scanning path such that the welding beam trails behind the cleaning beam along the common scanning path upon the substrate surface; decontaminating the substrate surface of the component along the common scanning path via the cleaning beam; and melting the cladding material via the welding beam along the common scanning path such that the melted cladding material contacts the decontaminated substrate surface along the common scanning path and, upon solidifying, bonds to the base material of the component forming the substrate surface. In at least some of such embodiments, the cleaning and welding beams synchronously advance along the common scanning path.

In embodiments of a method for laser cladding following principles of the present disclosure, the method can also include machining the component to form a repair surface. The component can be one that has been removed from service in a machine system and has been machined to remove material of the component having a defect therein.

For example, in embodiments, a component in the form of a used shaft can be machined (such as on a lathe) to remove damaged and/or worn material therefrom. The repair surface can have a dimension with a value being less than a specification value. The step of depositing the cladding material upon the component (step 730) includes depositing the cladding material upon the repair surface. The cladding material is bonded to the repair surface of the component such that the value of the dimension is increased to be equal to or greater than the specification value. In embodiments, the layer of cladding material can be subjected to machining (e.g., grinding) to bring the value of the dimension within a target range for the specification value. In embodiments, a conventional or a CNC lathe machine, a milling machine, and the like can be used for machining operation. In other embodiments, machining operations can be performed using other techniques, such as, electrical discharge machining, electrochemical machining, electron beam machining, photochemical machining, and ultrasonic machining, for example.

INDUSTRIAL APPLICABILITY

The industrial applicability of the embodiments of a laser cladding system and a method for laser cladding described herein will be readily appreciated from the foregoing discussion. The described principles are applicable to a variety of components. For example, components such as cam shafts, crank shafts, pump shafts, gears, seal rings, and other high-performance applications can be subjected to relatively harsh conditions while in service resulting in various forms of wear and/or damage to the component. Using principles of the present disclosure, a layer of cladding material that is harder than the base material from which the component is made can be applied to the surface of the component prior to use to increase the service time of the component. Using principles of the present disclosure, a component can also be rebuilt or re-coated with a layer of cladding material in a remanufacturing process using laser cladding principles according to the present disclosure to further increase the service time of the component.

Those skilled in the art will be familiar with the conditions during many welding procedures which are conducive to the formation of oxide contaminants upon surfaces of material exposed to an oxidative environment. Oxide contamination can reduce the integrity of the welding process, and in the case of layers of cladding material result in voids and other imperfections that can create or propagate cracks and/or lead to the cladding layer delaminating from the substrate surface of the component. In embodiments, a laser cladding system constructed according to principles of the present disclosure can be used to apply a bead of molten cladding material upon a substrate of a component under controlled environmental conditions configured to reduce the occurrence and/or size of pores within the cladding material layer formed when the bead solidifies.

In embodiments, a system for laser cladding constructed according to principles of the present disclosure can be used to perform a method for laser cladding that includes placing a component within a cladding area defined by an interior surface of a chamber and which comprises a sealed volume. The chamber includes a window that is made from a laser-transparent material. A vacuum pressure can be generated within the cladding area sufficient to evacuate gas therefrom. In embodiments, a pump system generates a vacuum pressure within the cladding area of the chamber sufficient to evacuate oxygen therefrom such that the propensity of the cladding material and/or the substrate surface of the component to oxidize is reduced. In embodiments, the pump system generates a vacuum pressure within the cladding area sufficient to evacuate substantially all of the oxygen from the cladding area within the chamber. In embodiments, the cladding area can be backfilled with an inert gas (e.g., argon) after evacuating the ambient gas therefrom.

A cladding material is deposited upon the component. A laser beam is directed from outside the chamber through the window such that the laser beam melts the cladding material upon the component. The laser beam is moved relative to the component along a scanning path by using a robotic laser motion system to move a laser head from which the laser beam is emitted. In embodiments, the feedstock can be feed into the vacuum system and be coincident on the focal point of the laser beam. In embodiments, such as, depending upon the complexity of the component to be clad, a secondary robot can be provided to manipulate the component and/or the feedstock deposition location within the chamber during the laser cladding process. A controller 40 can be provided to coordinate the robotic systems to act in a coordinated fashion to remain coincident during the laser cladding process.

The cladding material is allowed to solidify such that the cladding material is bonded to the component. In embodiments, the layer of cladding material and the underlying substrate surface of the component are secured together in a metallurgical bond that has superior bond strength over a cladding layer applied using a conventional thermal spray process.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A laser cladding system comprising:
   a laser apparatus, the laser apparatus configured to generate a laser beam during at least one cladding operation;
   a chamber, the chamber including an interior surface, the interior surface defining a cladding area within the chamber, the cladding area comprising a sealed volume, the chamber including a window, the window being made from a laser-transparent material and configured to allow the laser beam to pass therethrough into the cladding area; and
   a pump system, the pump system having at least one pump and at least one port in communication with the cladding area, the pump system configured to perform at least one preparation cycle within the cladding area,
   wherein a panel is removably secured to a body of the chamber such that the panel occludes a component opening and is in sealing relationship with the body, the component opening being defined by the body of the chamber having the interior surface defining the cladding area, a component being sealed therein,
   wherein the at least one cladding operation includes:
      depositing, upon the component within the cladding area comprising the sealed volume, a cladding material,
      directing, from outside the chamber including the interior surface defining the cladding area, the laser beam through the window of the chamber such that the laser beam melts the cladding material upon the component within the cladding area,
      moving the directed laser beam relative to the component within the cladding area along a scanning path by using a robotic laser motion system of the laser apparatus to move a laser head of the laser apparatus, from which the laser beam is emitted, relative to a reference point within the chamber, and
      allowing the cladding material to solidify such that the cladding material is bonded to the component,
   wherein the at least one preparation cycle includes generating, within the cladding area, a vacuum pressure sufficient to evacuate gas therefrom, and backfilling, after evacuation of the gas, the cladding area with an amount of an inert gas, and
   wherein the vacuum pressure generated during the at least one preparation cycle is maintained during the at least one cladding operation.

2. The laser cladding system of claim 1, wherein the robotic laser motion system is configured to move the laser head such that the laser beam moves relative to the reference point within the chamber with at least two degrees of freedom.

3. The laser cladding system of claim 1, wherein the laser apparatus includes an optic set, the optic set configured to direct the laser beam into a laser beam shape.

4. The laser cladding system of claim 1, wherein the pump system includes a supply of the inert gas, the pump system being configured to selectively backfill the cladding area with the amount of the inert gas from the supply of the inert gas during the at least one preparation cycle.

5. The laser cladding system of claim 1, wherein the component opening is configured to permit the component to pass therethrough for being placed within the cladding area.

6. The laser cladding system of claim 1, wherein the panel includes the window.

7. The laser cladding system of claim 1, further comprising:
   a component fixture, the component fixture disposed within the cladding area of the chamber, and the component fixture being configured to support the component.

8. The laser cladding system of claim 7, wherein the component fixture includes a robotic component motion system, the robotic component motion system configured to move the component supported by the component fixture relative to the laser beam.

9. The laser cladding system of claim 7, further comprising:
   a material feeder apparatus, the material feeder apparatus having a feedstock discharge end, the feedstock discharge end disposed within the cladding area of the chamber, the material feeder apparatus configured to selectively dispense the cladding material from the feedstock discharge end.

10. The laser cladding system of claim 9, wherein the material feeder apparatus includes a robotic feeder motion system, the robotic feeder motion system configured to move the feedstock discharge end relative to the component when the component is supported by the component fixture.

11. A method for laser cladding comprising:
    placing a component within a cladding area comprising a sealed volume and being defined by an interior surface of a chamber, the chamber including a window made from a laser-transparent material, wherein said placing the component within the cladding area includes passing the component through a component opening defined by a body of the chamber, and removably securing a panel to the body after the component is placed within the cladding area such that the panel occludes the component opening and is in sealing relationship with the body;
    performing at least one preparation cycle, within the cladding area, including generating, within the cladding area, a vacuum pressure sufficient to evacuate gas therefrom, and backfilling, after evacuation of the gas, the cladding area with an amount of an inert gas; and
    performing at least one cladding operation, including:
        depositing, upon the component within the cladding area comprising the sealed volume, a cladding material,
        directing, from outside the chamber including the interior surface defining the cladding area, a laser beam through the window of the chamber such that the laser beam melts the cladding material upon the component within the cladding area,
        moving the directed laser beam relative to the component within the cladding area along a scanning path by using a robotic laser motion system to move a laser head from which the laser beam is emitted, and
        allowing the cladding material to solidify such that the cladding material is bonded to the component,
    wherein the vacuum pressure generated during the at least one preparation cycle is maintained during performing the at least one cladding operation.

12. The method for laser cladding according to claim 11, wherein the component is made at least in part from a substrate material, and the cladding material is bonded to the substrate material, the substrate material being different from the cladding material.

13. The method for laser cladding according to claim 11, wherein said moving the directed laser beam relative to the component along the scanning path includes translating the directed laser beam relative to the component along the scanning path.

14. The method for laser cladding according to claim 11, further comprising:
    machining the component to form a repair surface, the repair surface having a dimension with a value being less than a specification value,
    wherein depositing the cladding material upon the component includes depositing the cladding material upon the repair surface, and
    wherein the cladding material is bonded to the repair surface of the component such that the value of the dimension is increased to be equal to or greater than the specification value.

15. The method for laser cladding according to claim 11, wherein said moving the directed laser beam relative to the component along the scanning path includes using a robotic component motion system to move the component.

16. The method for laser cladding according to claim 15, wherein the robotic component motion system rotates the component about a component rotational axis.

17. The method for laser cladding according to claim 11, wherein said depositing the cladding material upon the component includes dispensing the cladding material from a feedstock discharge end of a material feeder apparatus, the feedstock discharge end disposed within the cladding area of the chamber.

18. The method for laser cladding according to claim 17, wherein said depositing the cladding material upon the component includes moving the feedstock discharge end relative to the component such that the cladding material is deposited along the scanning path, and
    wherein directing the laser beam includes moving the laser beam relative to the component such that the laser beam follows along the scanning path.

* * * * *